United States Patent [19]

Chang

[11] Patent Number: 5,477,279
[45] Date of Patent: Dec. 19, 1995

[54] CIRCUIT FOR SAVING POWER CONSUMPTION IN STANDBY STATE

[75] Inventor: Gil Y. Chang, Suwon, Rep. of Korea

[73] Assignee: Samsung Electronics Co., Ltd., Kyungki-Do, Rep. of Korea

[21] Appl. No.: 351,084

[22] Filed: Nov. 30, 1994

[30] Foreign Application Priority Data

Nov. 30, 1993 [KR] Rep. of Korea ............... 93-25900

[51] Int. Cl.⁶ ............................................. H04N 5/44
[52] U.S. Cl. ................................. 348/730; 358/335
[58] Field of Search ..................... 348/730; 358/335; 345/212, 213; 363/21

[56] References Cited

U.S. PATENT DOCUMENTS

| | | | |
|---|---|---|---|
| 4,802,290 | 8/1989 | Jung et al. | 348/730 X |
| 5,189,600 | 2/1993 | Keck et al. | 348/730 X |
| 5,270,823 | 12/1993 | Heidebroek et al. | 348/730 |

*Primary Examiner*—Victor R. Kostak
*Assistant Examiner*—Nathan J. Flynn
*Attorney, Agent, or Firm*—Sughrue, Mion, Zinn, Macpeak & Seas

[57] ABSTRACT

A circuit for saving power consumption in a TV/VCR set reduces the voltage induced into the secondary of a transformer when the set is in standby, when the monitor is off and when a programmed recording operation takes place. The circuit includes a power rectifying section for rectifying the voltage input from an electrical outlet, a switching section for causing the output of the power rectifying section to be induced into the secondary side of a transformer with the switching time of the switching section being controlled by the feedback of the output power from the secondary of the transformer, a secondary rectifying section for rectifying and smoothing the voltage induced in the secondary side of the transformer, a feedback section for feeding back the output voltage of the secondary rectifying section to the switching section, and a reference voltage detection control section for adjusting the feedback amount of the feedback section by comparing the output voltage of the secondary rectifying section with a reference voltage. The circuit further include a microprocessor for outputting high or low signals in accordance with the state of the TV/VCR set, a monitor power control section for controlling the supply of voltage from the secondary rectifying section to a horizontal oscillating voltage terminal of a monitor of the set under the control of the microprocessor during a state when the monitor is turned off, a standby state or a programmed recording, and a standby state power control section controlling the feedback amount of the feedback section by forcibly dropping the output voltage of the secondary side under the control of the microprocessor during a standby state.

5 Claims, 4 Drawing Sheets

CIRCUIT FOR SAVING POWER CONSUMPTION IN STANDBY STATE

BACKGROUND OF THE INVENTION

The present invention relates to a circuit for saving power consumption in an electronic appliance during a standby state. More specifically, the present invention relates to a circuit, for use in a home appliance (TV/VCR) consisting of a combination of a TV and a VCR (video cassette recorder), for saving power consumption during a standby state by reducing the output voltage during the standby state to save power consumption and to improve reliability.

FIG. 1 illustrates a conventional power supply circuit of the type used in home electronic appliances. As shown in this drawing, the circuit includes: a power source rectifying section 102 for rectifying an AC voltage supplied from an electrical outlet via a power plug 101; a switching section 103 for applying the DC voltage from the rectifying section 102 to the primary side of a transformer T1 through a switching operation; a secondary rectifying section 104 for rectifying the rectangular waves induced in the secondary side of the transformer T1 to provide the output power for the appliance, such as a monitor and a video apparatus; a reference voltage detection control section 105 for comparing the output voltage of the secondary rectifying section with a reference voltage and providing control signals from an output thereof; and a feedback section 106 for adjusting the feedback amount of the output voltage of the secondary rectifying section 104 under the control of the reference voltage detection control section 105 to control the switching of the switching section 103.

The feedback section 106 controls the on/off time of the switching section 103, so that a stabilized voltage can be obtained. The feedback section 106 is composed of a photo coupler consisting of a photo diode and a photo transistor. When a current is supplied to the photo diode, the photo coupler is turned on in such a manner that a current is supplied to the base of a photo transistor as a result of the light from the photo diode illuminating the base, so that the photo transistor turns on and a current flows from the collector to the emitter of the transistor. Under this condition, the photo diode and the photo transistor are electrically insulated from each other.

In the circuit of FIG. 1 constituted as described above, the AC voltage is rectified and smoothed by the power source rectifying section 102, before being output as a DC voltage to the switching section 103. The switching section 103 is turned on and off under the control of the feedback section 106, so that the output voltage of the power source rectifying section 102 will be induced on the secondary side of the transformer T1. The rectangular waves, which are induced on the secondary side of the transformer T1, are rectified and smoothed by the secondary rectifying section 104 to become a DC voltage which is to be supplied as the power for a monitor and a video apparatus. Further, the output voltage of the secondary rectifying section 104 is supplied to both the reference voltage detection control section 105 and the feedback section 106.

Under this condition, the reference voltage detection control section 105 compares a reference voltage with the output voltage of the secondary rectifying section 104 for maintaining a constant voltage level. If the output voltage of the secondary rectifying section 104 is higher or lower than the reference voltage, a control signal is emitted to the feedback section 106, so that the feedback amount will be adjusted.

The feedback section 106 adjusts the feedback amount of the output voltage of the secondary rectifying section 104 under the control of the reference voltage detection control section 105 for the purpose of controlling the switching on/off time of the switching section 103, thereby obtaining a constant voltage all the time. Accordingly, when the user watches a TV or carries out a programmed recording by utilizing the circuit of FIG. 1, there will be no problem.

However, the voltage in the secondary side of the transformer T1 is also maintained at a high level during standby states, resulting in unnecessary power consumption.

U.S. Pat. No. 4,737,851 discloses a circuit which is entitled "On/Off Control Circuitry for Television." According to this circuit, the generation of a deflection current is prevented during a standby state in a television, thereby saving power consumption. That is, the circuit of U.S. Pat. No. 4,737,851 includes: a deflection circuit for producing a deflection current in a deflection coil during the normal mode; a voltage source for providing a first supply voltage during the standby state and during the normal mode; and a control circuit coupled with the deflection circuit for controlling the operation of the deflection circuit during the normal mode and for preventing the formation of a deflection current during the standby mode. Thus, the operation of the deflection circuit is controlled during the normal mode, while the generation of the deflection current is prevented during the standby mode. In this way, the monitor is turned off, so that power consumption is reduced during the standby state. However, the power consumption for the VCR itself is not saved by the circuit of the latter patent.

SUMMARY OF THE INVENTION

The present invention is intended to overcome the above-described disadvantages of the conventional techniques.

Therefore, it is an object of the present invention to provide a circuit for reducing power consumption during a standby state, in which the voltage is forcibly stepped down under the control of a microprocessor to adjust the feedback amount and to lower the input consumption power, thereby preventing the otherwise unnecessary power dissipation.

In achieving the above object, the circuit according to the present invention includes: a power rectifying section for rectifying the voltage input applied from an electrical outlet through a power plug; a switching section for applying the output of the power rectifying section to the primary side of a transformer, whereby a voltage is induced into the secondary side of the transformer, with the switching time being controlled by the feedback of the output power; a secondary rectifying section for rectifying and smoothing the voltage induced on the secondary side of the transformer to produce the output power; a feedback section for feeding back the output voltage of the secondary rectifying section to the switching section; and a reference voltage detection control section for adjusting the feedback amount of the feedback section by comparing the output voltage of the secondary rectifying section with a reference voltage. The circuit according to the present invention further includes: a microprocessor for outputting high or low signals through relevant ports in accordance with the state of a TV/VCR set; a monitor power control section for supplying a monitor with a horizontal oscillating voltage under the control of the microprocessor during a turn-off of the monitor, during a standby state, or during a programmed recording; and a standby state power control section for controlling the feedback amount of the feedback section by forcibly dropping the output voltage of the secondary side under the control of the microprocessor during a standby state.

BRIEF DESCRIPTION OF THE DRAWINGS

The above object and other advantages of the present invention will become more apparent from the following description of a preferred embodiment of the present invention, taken in conjunction with the drawings, in which.

DESCRIPTION OF THE PREFERRED EMBODIMENT

Figure 1:
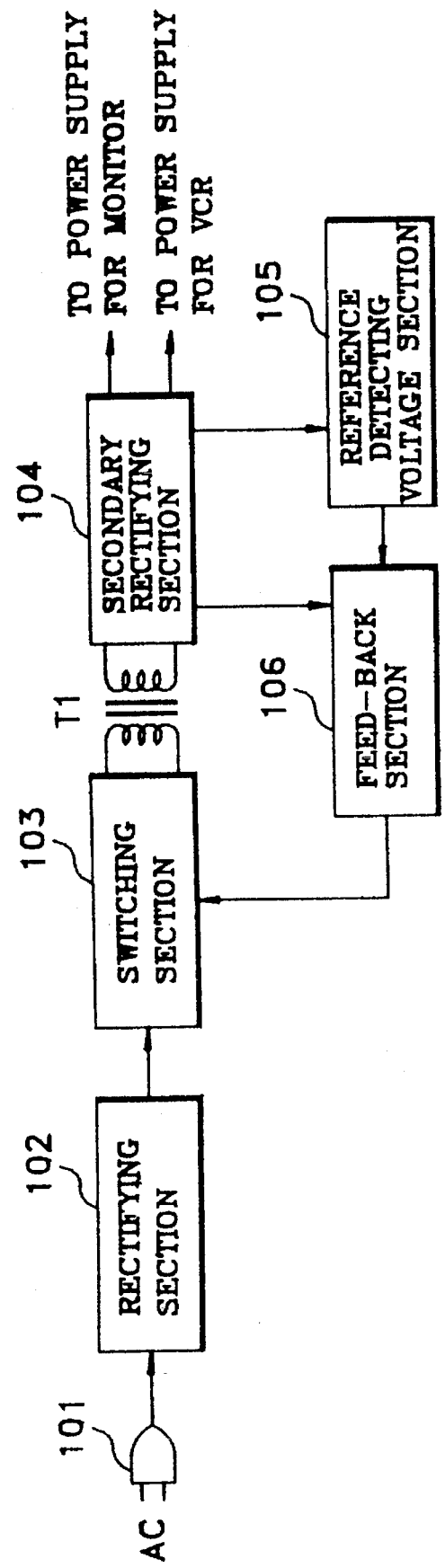
FIG. 1 is a block diagram showing the constitution of a conventional power supply circuit.
Figure 2:
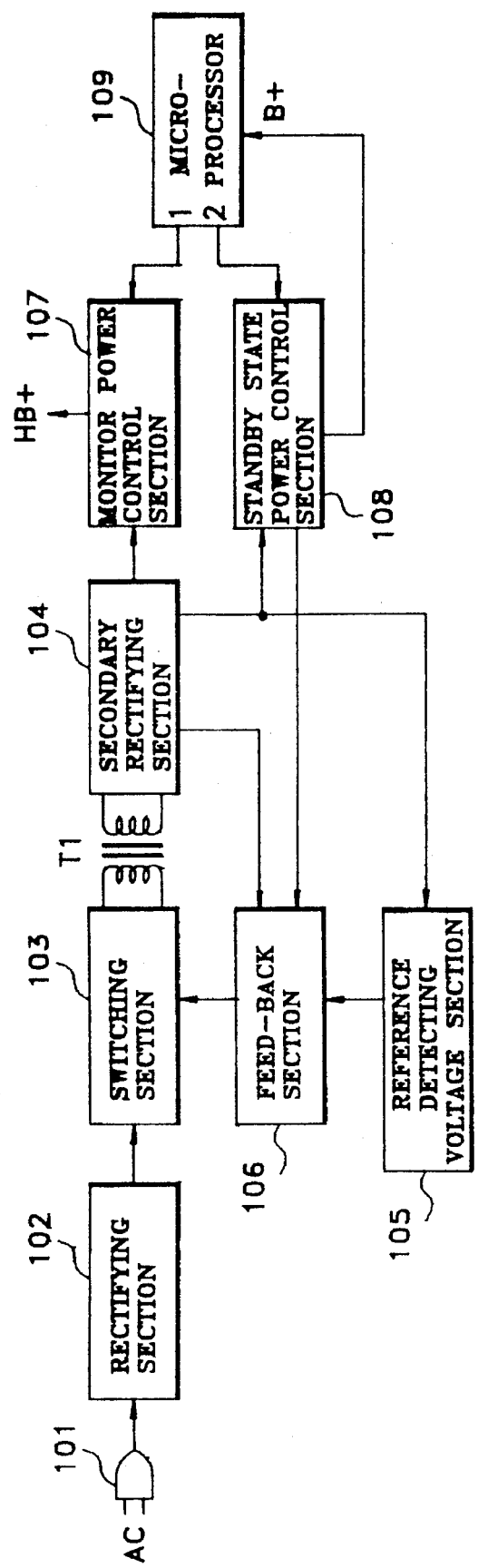
FIG. 2 is a block diagram showing the constitution of a circuit for saving power consumption during a standby state according to the present invention.
Figure 3:
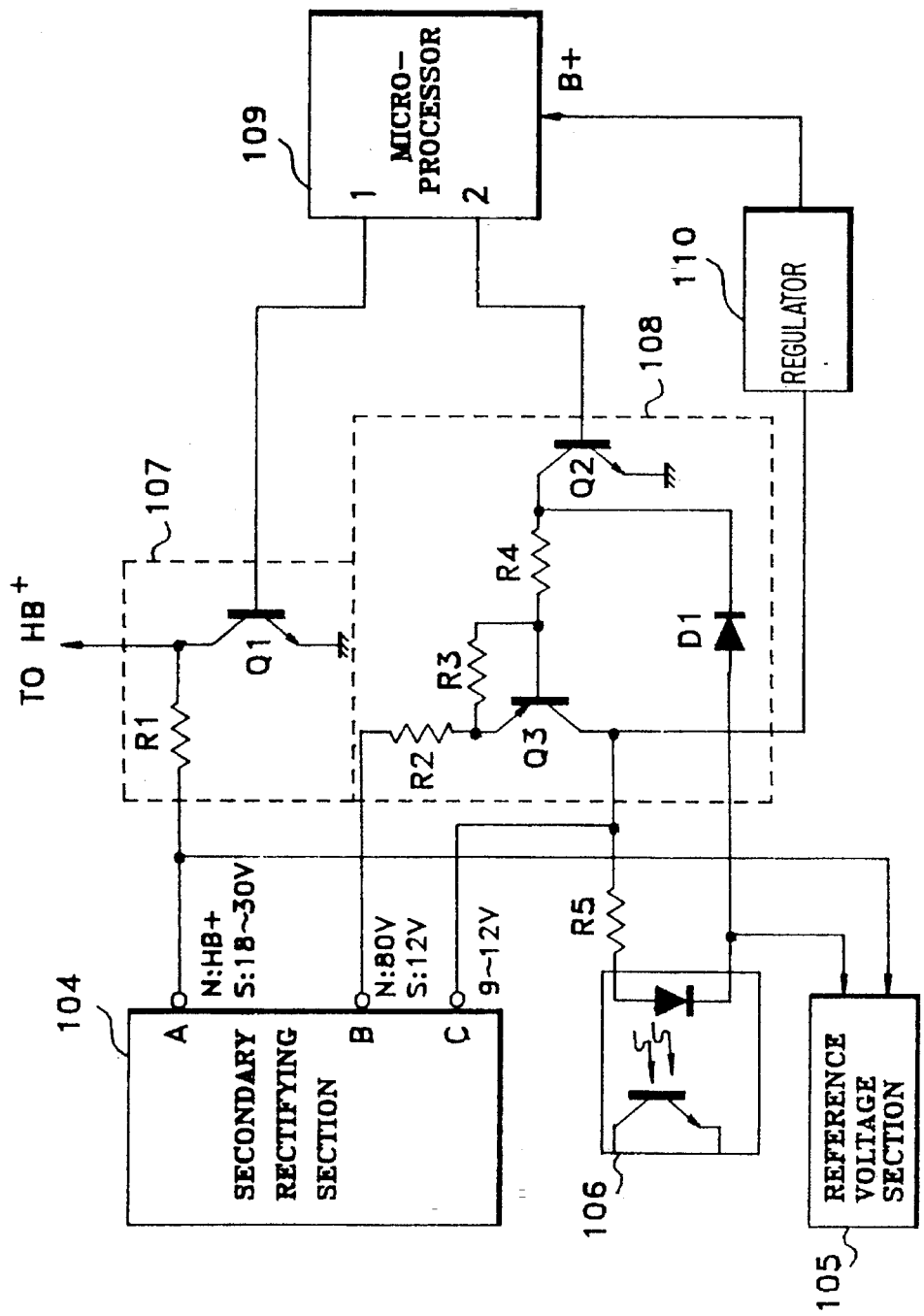
FIG. 3 is a detailed circuit illustration of the circuit for saving power consumption according to the present invention.

In the drawings, like elements are designated by like numbers. Referring to FIGS. 2 and 3, a monitor power control section 107 is connected between the secondary rectifying section 104 and a microprocessor 109. All the elements shown, except for the monitor power control section 107, the standby state power control section 108, and the microprocessor 109, are the same as those of FIG. 1. Therefore, only the monitor power control section 107, the standby state power control section 108, and the microprocessor 109 will be described.

The monitor power control section 107 consists of a transistor Q1, the base of which is connected to a first port of the microprocessor 109. The collector of the transistor Q1 is commonly connected to an "A" terminal of the secondary rectifying section 104 and to a horizontal oscillating voltage terminal B+, while the emitter of the transistor Q1 is connected to the ground. The terminal "A" supplies a supply voltage to the B+ horizontal oscillating voltage terminal of the monitor, unless the transistor Q1 is conducting. The standby state power control section 108 includes: a transistor Q2 with its base connected to a second port of the microprocessor 109; and a transistor Q3 with its base connected through a resistor R4 to the collector of the transistor Q2.

The emitter of the transistor Q3 is connected through a resistor R2 to a "B" terminal of the secondary rectifying section 104, and a biasing resistor R3 is connected between the emitter and the base of the transistor Q3. The collector of the transistor Q3 is commonly connected to a "C" terminal of the secondary rectifying section 104 and through a 5 V regulator 110 to a power source port of the microprocessor 109. Further, the collector of the transistor Q3 is connected through a resistor R5 to the anode of a photo diode of the feedback section 106. The reference voltage detection control section 105 is connected to the cathode of the photo diode of the feedback section 106 and to the "A" terminal of the secondary rectifying section 104.

Under this condition, it is assumed as follows. The "A" terminal of the secondary rectifying section 104 outputs a high voltage (HB+) in the normal mode, and outputs 18–30 V in the standby state. The "B" terminal outputs 80 V in the normal mode, and outputs 12 V in the standby state, while the "C" terminal outputs 9–12 V.

The operations of the microprocessor 109 are as shown in Table 1 below, and the program for the microprocessor is prepared based on Table 1.

TABLE 1

| Condition of Microprocessor | | First Port | Second Port |
| --- | --- | --- | --- |
| Power Source | On | Low (L) | Low (L) |
| | Off | High (H) | High (H) |
| Monitor | On | Low (L) | Low (L) |
| | Off | High (H) | Low (L) |
| Recording | Recording | Low (L) | Low (L) |
| | Reserved | High (H) | Low (L) |
| Standby state | | High (H) | High (H) |

In the present invention constituted as above, when the power plug 101 of the TV/VCR is inserted into the electrical outlet, and when the power of the TV/VCR is turned off, the TV\VCR set is in a standby state. In this state, the first and second ports of the microprocessor 109 are shifted to a high state. When the first port of the microprocessor 109 is shifted to a high state, a high state voltage is supplied to the base of the transistor Q1 to turn on the transistor. Consequently, the horizontal oscillating voltage B+ from the terminal "A" is not supplied to the monitor.

When the second port of the microprocessor 109 is shifted to a high state, the transistor Q2 is turned on, which results in the turning on of Q3. The voltage at terminal "B" of section 104 is then supplied via transistor Q3 to the 5 V regulator 110, which supplies a 5 V power voltage to the microprocessor 109, so that the microprocessor 109 is continuously operated.

Further, the diode D1 is turned on by the conducting state of the transistor Q2, and therefore the voltage which has been supplied to the C terminal of the secondary rectifying section 104 is fed back to control the switching of the primary side switching section 103 (FIG. 2) by being applied through the resistor R5, the feedback section 106, and the diode D1, with the result that the voltage of the secondary side is forcibly dropped. Under this condition, the feedback section 106 is no longer controlled by the reference voltage detection control section 105. As a result the switching of the switching section 103 is controlled to reduce the voltage induced in the transformer, and the voltage of the "A" terminal of the secondary rectifying section 104 drops to 18–30 V from the initial voltage HB+, and this voltage drop appears across the resistor R1.

When the power is turned on to watch the TV/VCR or to carry out a programmed recording, the first and second ports of the microprocessor 109 are shifted to the lower voltage state. Therefore, the transistor Q1 is turned off, and the voltage of the "A" terminal of the secondary rectifying section 104 is supplied through the resistor R1 to the monitor to serve as a horizontal oscillating voltage B+, such that the monitor is turned on. The second port of the microprocessor 109 is also in a low state, and therefore the transistor Q2 is turned off, which turns off transistor Q3.

Under this condition, the diode D1 is non-conducting, and therefore the voltage of the "C" terminal of the secondary rectifying section 104 is supplied through the resistor R5 and the feedback section 106 to the reference voltage detection control section 105. The reference voltage detection control section 105 detects the variation of the voltage of the "A" terminal of the secondary rectifying section 104, and adjusts the feedback amount of the feedback section to maintain the "A" voltage at its high level. Thus, when the TV/VCR is not in the operating state, even though the power plug is connected to the electrical outlet, the power on the secondary side of the transformer is reduced and not power is applied to the monitor.

In the above example, the power turn-off in Table 1 indicates the standby state. If only the monitor is turned off, and the set is operated in the normal manner for programmed recording, the following conditions occur. The first port of the microprocessor 109 goes to a high state, while the second port goes to a low state. When the first port of the microprocessor 109 is shifted to a high state, the horizontal oscillating voltage B+ is not supplied to the monitor due to the turning-on of the transistor Q1, and therefore the monitor is maintained in a turned-off state. But since the second port of the microprocessor 109 is in a low state, both of the transistors Q2 and Q3 are turned off, and therefore the feedback amount of the feedback section 106 is adjusted only by the reference voltage detection control section 105, as described above.

Figure 4:
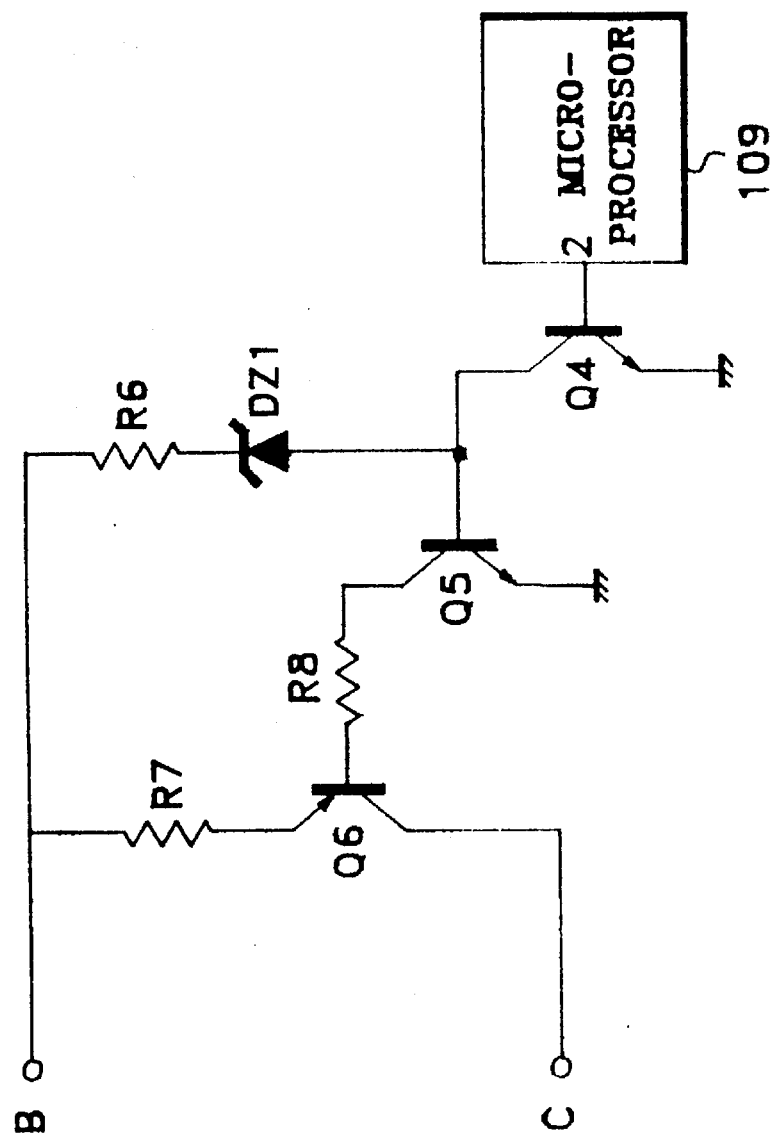
FIG. 4 illustrates another embodiment of the standby state power control section of FIGS. 2 and 3.

FIG. 4 is a circuit illustration showing another embodiment of the standby state power control section 108. As shown in FIG. 4, the circuit includes: a transistor Q4 with its base connected to the second port of the microprocessor 109; a transistor Q5 with its base connected to the collector of the transistor Q4; and a transistor Q6 with its base connected through a resistor R8 to the collector of the transistor Q5. The emitter of the transistor Q4 is grounded, while a zener diode DZ1 is connected between the collector of the transistor Q5 and the B terminal of the secondary rectifying section 104 through a resistor R6. The resistor R6 is provided for protecting the zener diode. The emitter of the transistor Q6 is connected through a resistor R7 to the B terminal of the secondary rectifying section 104, while the collector of the transistor Q6 is connected to the C terminal of the secondary rectifying section 104. The zener diode DZ1 is provided for biasing like the resistor R3 of FIG. 3.

Unlike FIGS. 2 and 3, it should be programmed such that, during a standby state, during a monitor turn-off, or during a programmed recording, the second port of the microprocessor 109 outputs low signals, and otherwise outputs high signals.

According to the present invention as described above, the output voltage of the secondary side is forcibly dropping to a proper level under the control of the microprocessor, so that the power consumption can be saved down to less than 10 W, thereby improving the reliability of the TV/VCR set.

Further, the present invention has a particular advantage in the light of current regulations in Europe and other countries requiring a standby power consumption of less than 10 W.

What is claimed is:

1. A circuit for saving power consumption during a standby state in a TV/VCR set, which has a monitor and provides programmed recording; said circuit including:

a power rectifying section for rectifying an ac voltage input to said TV/VCR to provide a dc voltage for providing the dc supply voltages to the component parts of the TV/VCR;

a transformer having a primary and a secondary side;

a switching section having the output dc voltage from said rectifying section applied thereto for supplying a switched voltage to the primary of said transformer to induce a switched voltage into the secondary side of said transformer, the switching time of said switching section being controlled by a feedback signal supplied thereto;

a secondary rectifying section for rectifying and smoothing the voltage induced in the secondary side of said transformer;

a feedback section connected to said secondary rectifying section for providing said feedback signal to said switching section to control the switching thereof and concomitantly to control the voltage induced into said secondary;

a reference voltage detection control section connected to said secondary rectifying section for adjusting said feedback signal of said feedback section by comparing the output voltage of said secondary rectifying section with a reference voltage;

a microprocessor for sensing the power conditions of said TV/VCR set and providing voltage control signals of high/low type at output ports thereof depending upon the power state of said TV/VCR set;

a monitor power control section connected to said secondary rectifying section, said microprocessor, and said monitor for controlling the supply of a voltage to said monitor such that the voltage supply to said monitor is cut off during a turn-off of the monitor, during a standby state, and during a programmed recording; and a standby state power control section connected to said monitor and said feedback section for causing said feedback section to vary said feedback signal to result in the forcible reduction of the voltage induced in said secondary.

2. The circuit as claimed in claim 1, wherein said secondary rectifying section has a first output terminal connected to a horizontal oscillating voltage terminal of said monitor to provide a supply voltage to said monitor, and wherein said monitor power control section comprises a transistor (Q1) connected to said microprocessor to be turned on and off under the control of said microprocessor; said transistor (Q1) having an emitter collector path connected at one end to said first output terminal and said horizontal oscillating voltage terminal and at the other end to ground, so that the voltage of a first output terminal of said secondary rectifying section; such that the on/off control of said transistor by said microprocessor controls whether the voltage at said first output terminal is supplied or not to said horizontal oscillating voltage terminal of the monitor.

3. The circuit as claimed in claim 1, further comprising a voltage regulator, and wherein said secondary rectifying section has a first output terminal and a second output terminal for providing voltages to circuitry of said set, and whereby said standby state power control section comprises:

a transistor (Q2) connected to an output port of said microprocessor for being turned on and off under the control of said microprocessor;

a transistor (Q3) connected to said second transistor (Q2) for supplying the voltage at said first output terminal of said secondary rectifying section through said voltage regulator to said microprocessor when said second transistor turns on, and for forcibly feeding back the voltage at said second output terminal of said secondary rectifying section to said feedback section to result in the reduction of the voltage induced in said secondary side of transformer; and a diode connected both to said transistor (Q2) and to said feedback section, and for being turned on upon turning on said transistor (Q2), thereby forcibly dropping the output voltage of the secondary side.

4. The circuit as claimed in claim 1, wherein said secondary rectifying section has first and second output ports for supplying voltages to said set, and wherein said standby state power control section comprises:

a transistor (Q4) connected to an output port of said microprocessor for being turned on and off under the control of said microprocessor;

a transistor (Q5) connected to said transistor (Q4) for being turned on and off by the turning-on/off of said transistor (Q4); and a transistor (Q6) for supplying the voltage of said first output terminal of said secondary rectifying section in accordance with the turning-on/off of said transistor (Q5), and for forcibly feeding back the voltage of said second output terminal of said secondary rectifying section, thereby forcibly dropping the voltage of the secondary side.

5. The circuit as claimed in claim 1, wherein said standby state power control section is constituted such that said feedback section is not controlled by said reference voltage detection control section under the control of said microprocessor during a standby state.

* * * * *